United States Patent [19]

Vreeswijk et al.

[11] Patent Number: 4,625,239

[45] Date of Patent: Nov. 25, 1986

[54] TELEVISION CIRCUIT FOR PICTURE FLICKER CORRECTION

[75] Inventors: Franciscus W. P. Vreeswijk; Sing L. Tan; Leendert J. Van De Polder, all of Eindhoven, Netherlands

[73] Assignee: U.S. Philips Corporation, New York, N.Y.

[21] Appl. No.: 675,119

[22] Filed: Nov. 27, 1984

[30] Foreign Application Priority Data

Dec. 5, 1983 [NL] Netherlands .................. 8304165

[51] Int. Cl.$^4$ .............................................. H04N 7/01
[52] U.S. Cl. ...................................... 358/140; 358/105
[58] Field of Search ................. 358/140, 105, 342, 11

[56] References Cited

U.S. PATENT DOCUMENTS

| 4,090,218 | 5/1978 | Van Buul et al. | 358/37 |
| 4,296,434 | 10/1981 | Drewery et al. | 358/105 |
| 4,485,401 | 11/1984 | Tan et al. | 358/141 |

*Primary Examiner*—Howard W. Britton
*Assistant Examiner*—Victor R. Kostak

*Attorney, Agent, or Firm*—Thomas A. Briody; William J. Streeter; Edward W. Goodman

[57] ABSTRACT

A picture flicker correction is desired with video disc players involving display of a stop-motion or still television picture and with television displays using field and line frequency doubling, in accordance with the so-called ABAB method. With a movement detector (51) movement or the absence of movement is detected. Two adding circuits (19, 22) are connected in parallel to delay devices (9, 9+12) having time delays substantially equal to a field period. By means of two switch-over devices (32, 37) switched by the movement detector (51), the delay devices (9, 9+12) or the adding circuits (19, 22) can be coupled with a switch-over device (45) which is switched once per field period. A further delay device (42) having a time delay substantially equal to a field period provides for information transfer during second field periods of frame periods comprising two field periods. In the absence of movement detection, the original information is transferred, and in the event of movement detection, the combined information is transferred.

8 Claims, 2 Drawing Figures

TELEVISION CIRCUIT FOR PICTURE FLICKER CORRECTION

BACKGROUND OF THE INVENTION

The invention relates to a television circuit for a picture flicker correction, provided with a first and a second delay device coupled to an input terminal of the television circuit, which delay devices each have a delay time substantially corresponding to a field period, inputs of a first and a second adding circuit being respectively connected in parallel with the first and the second delay devices, the outputs of the first and second adding circuits being coupled to respective inputs of a first switch-over device which has a switching input for a switching signal which controls the switching of the switch-over device at each field period, the output of the switch-over device being coupled to the output terminal of the television circuit.

A circuit of this kind is known from U.S. Pat. No. 4,090,218, in particular from FIG. 7a where it is described that in a video disc display system which includes the feature of stop-motion, or a still television picture, produced by repeated display of the information of two fields, such display normally gives rise to a flicker phenomenon which does not occur with continuous display. This is due to the occurrence of motion which takes place in the scene televised in the interval between the pick-up instants of the two fields. Repeated display of the two fields including the information shift between the two partial pictures, which shift is due to the motion in the scene, gives rise to the flicker phenomenon, which occurs at frame frequency.

To effect flicker correction, it is proposed, with the aid of the delay devices, the adding circuits and the switch-over device, to form combinations of video information divided into discrete groups which each comprise two associated field periods and to record these preformed combinations on the video disc. The repeated display of groups of two associated fields eliminates flicker upon display of the stop-motion or still picture.

The problem described is equally present in television displays using field and line frequency doubling. Here, a sequence of television fields ABCD etc., in the four field periods given as an example, is displayed in the sequence AABBCCDD or in the sequence ABABCDCD. Both methods AABB and ABAB have the advantage that the field frequency of 50 or 60 Hz is increased to 100 or 120 Hz, as the result of which field frequency flicker also occurs at the doubled frequency and is no longer perceptible. Here the method ABAB has the further advantage that a 25 or 30 Hz line flicker is converted into a 50 or 60 Hz line flicker, which is much less troublesome. A drawback of the ABAB method, however, is the occurrence of the troublesome flicker phenomenon, as described, when playing the video disc with the stop-motion possibility.

The U.S. Pat. No. 4,090,218 describes that, irrespective of the picture content upon pick-up and display, the video signal combinations continue to be produced even where, owing to the absence of a local change in video information, often caused by movement in the picture, this is not necessary. Further a movement detector has been developed which makes accurate movement detection possible.

SUMMARY OF THE INVENTION

A television circuit according to the invention with picture flicker correction applied only where it is required is characterized in that when the television circuit additionally includes a movement detector, second and third switch-over devices, respectively, provided between the output of the first and second adding circuits and a respective input of the first switch-over device, a switching input of the second and the third switch-over devices being coupled to an output of the movement detector, the second and third switch-over devices each having a further input which is connected to a respective point of the first and second delay devices which said further inputs, in the absence of movement detection, are connected to the respective output of the second and third switch-over devices to which respective output in the presence of movement detection the other input is connected, a third delay device having a delay time substantially equal to a field period being present between the output of the second switch-over device and the associated input of the first switch-over device or the output of the movement detector and the switching input of the third switch-over device.

The result of this is that in the absence of movement in a picture for display, the original video information is passed on, but with a delay, whereas in the local presence of the movement, a required video information combination is passed on by the television circuit.

A simple embodiment of a television circuit in accordance with the invention is characterized in that the first and second delay devices are constituted by the series arrangement of a delay device having a delay time equal to a field period less half a line period and a delay device having a delay time equal to a line period, said further input of the second and third switch-over devices being respectively coupled with the input and the output of said series arrangement.

A further embodiment with a desired video information combination is characterized in that the third delay device when present between the output of the second switch-over device and the associated input of the first switch-over device, has a delay time equal to a field period less half a line period.

Another simple embodiment of a television circuit in accordance with the invention is characterized in that the first and second delay devices are constituted by the series arrangement of a delay device having a delay time equal to a field period plus half a line period and a delay device having a delay time equal to a field period less half a line period, the said further input of the second and third switch-over devices being coupled with the junction point between the first and second delay devices.

A further embodiment is characterized in that the third delay device when present between the output of the movement detector and the switching input of the third switch-over device has a delay time equal to a field period plus half a line period.

A television circuit in accordance with the invention provided with a suitable movement detector giving accurate movement detection is characterized in that the movement detector has three delay devices of which the first and second delay devices form part each having a time delay which differs from a field period by half a line period, the two outer of the three delay devices both having a delay period which is either shorter or longer than a field period while the middle delay device has a delay which differs to that of the other two, which movement detector is provided with two subtraction circuits having inputs coupled with junction points of the said three delay devices between which there is a delay time equal to two field periods whereby between the two subtraction circuits and the output of the movement detector is present full-wave rectifying circuit followed by a noise-threshold circuit.

A more advanced embodiment is characterized in that each of the two subtraction circuits is followed by a full-wave rectifying circuit coupled via an adding circuit with the noise-threshold circuit.

DESCRIPTION OF THE DRAWINGS

Embodiments of the invention will now be described, by way of example, with reference to the accompanying diagrammatic drawings, in which.

DESCRIPTION OF THE PREFERRED EMBODIMENTS

Figure 1:
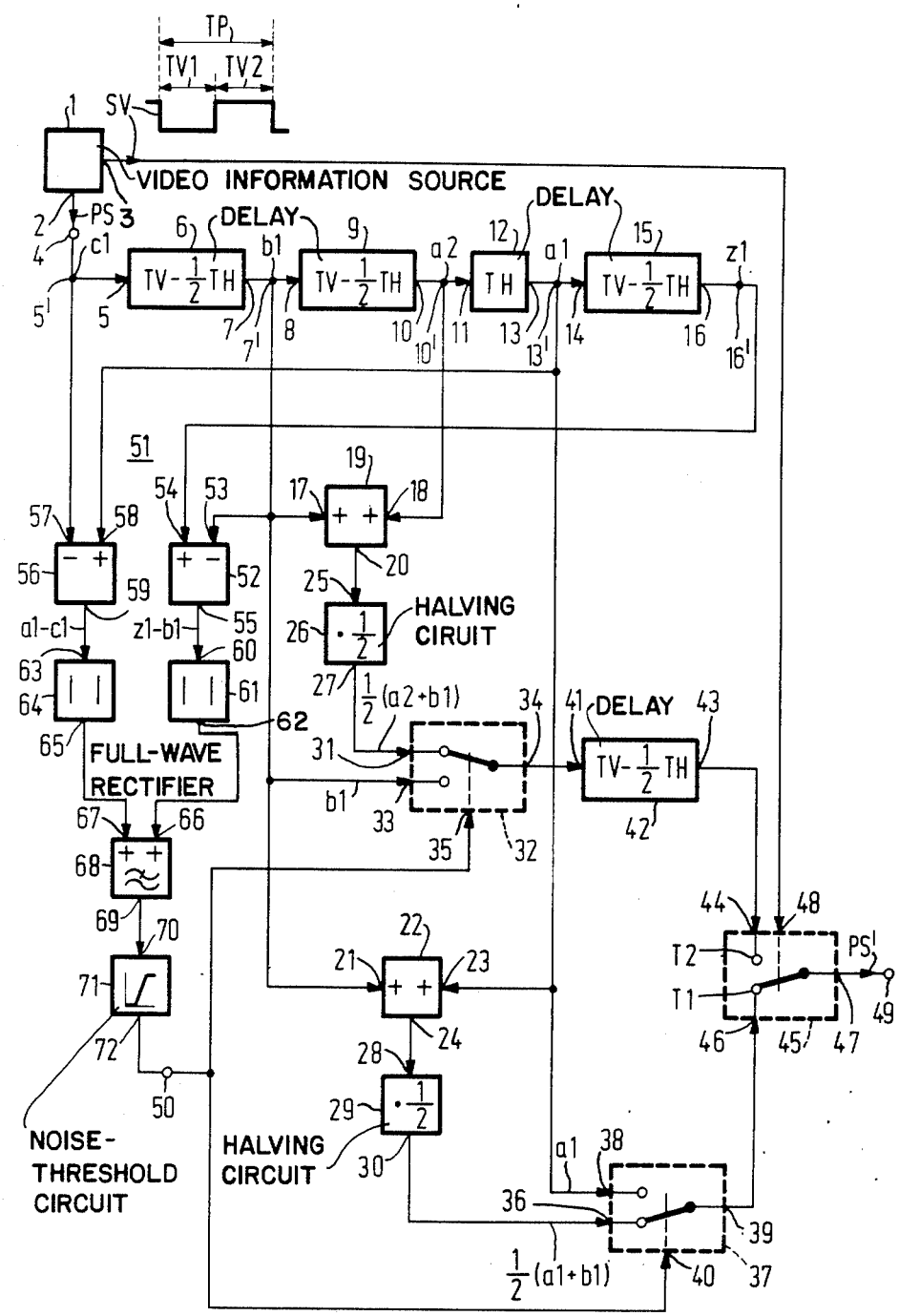
FIG. 1 shows a first embodiment of a television circuit in accordance with the invention.

In the embodiment of a television circuit according to the invention as shown in FIG. 1, the numeral 1 denotes a video information source, an output of which with video information PS is denoted by 2 and an output with field synchronizing information SV is denoted by 3. The field synchronizing information SV is drawn, as a function of time, as a square-wave signal, where TP denotes a frame period, which comprises two field periods TV1 and TV2. The field period TV1 is taken to be the first field period of the frame period TP and the field period TV2 is taken to be the second field period thereof, as laid down in a television standard. For the 625 line standard with five pre-equalizing pulses in a composite line and field synchronizing signal, the first field period TV1 begins at the leading edge of the first field synchronizing pulse after the previous field has ended with the scanning of a half line. In the 525 line standard with six pre-equalizing pulses, the first field period TV1 begins after the ending of the preceding field scan with the scanning of a whole line. Instead of the choices described, non-standardized ones may also be chosen. Unless otherwise agreed, it is necessary to transmit a picture synchronizing signal with the video information PS. This can be done by combining the video information PS with synchronizing and blanking information to form a video signal in accordance with the standard and then adding the picture synchronizing information. Another possibility is to provide a receiver of the information with a detector for the field scan termination with a half line (625 line standard) or a whole line (525 line standard). As regards the embodiment of the video information source 1, this may comprise a television camera, a tape or disc recording and reproduction device, a telecine conversion device, and so on, suitable for black and white or color television. The television circuit may, for example, be present in a television studio with the source 1 being remote at a distance from it or in which the source 1 is present.

The output 2 of source 1 is coupled with an input terminal 4 of the television circuit in accordance with the invention. In the following, couplings between the circuit components will be defined as connections which may, however, comprise further components such as amplifiers, separation stages and so on. The input terminal 4 is connected to an input 5 of a delay device 6 which is provided with an output 7 and has a delay time substantially equal to a field period TV, or, more precisely a field period TV less a half-line period TH. The output 7 is connected to an input 8 of a delay device 9 which likewise has a delay time equal to TV−½TH. An output 10 of the delay device 9 is connected to an input 11 of a delay device 12 having a delay time equal to one period TH. An output 13 of the line delay device 12 is connected to an input 14 of a delay device 15 which is provided with an output 16 and has a delay time equal to TV−½TH.

The outputs 16, 13, 10 and 7 and the input 5 carry, by way of example, some momentary information denoted at the junction points 16', 13', 10', 7' and 5' by, respectively, z1, a1, a2, b1 and c1. The information a1 and a2 are line information belonging to the first and second lines, respectively, of a television field A. The information b1 is the line information belonging to the first line in the following television field B, which line lies, in the interlaced television system, between the lines a1 and a2. The first field period TV1 is taken to belong to the television field A and the second field period TV2 to the television field B, resulting in a television frame AB. The line information c1 of the first line of a following television frame CD is present on the same line as the line information a1 and the line information z1 of the first line of a preceding television frame YZ is present on the same line as the line information b1.

Inputs 17 and 18 of an adding circuit 19, which is provided with an output 20, are connected in parallel with the delay device 9. Inputs 21 and 23 of an adding circuit 22, which is provided with an output 24, are connected in parallel with a series arrangement (9, 12) of the delay devices 9 and 12. Here a first and a second delay device 9 and (9+12) operate with a delay time equal to TV−½TH and TV+½TH respectively, which delay times are substantially equal to the field period TV. Both delay devices 9 and (9+12) can be denoted as one field delay device. The output 20 of the adding circuit 19 is connected to an input 25 of a halving circuit (·½) 26 which is provided with an output 27 while the output 24 of the adding circuit 22 is connected to an input 28 of a halving circuit 29 which is provided with an output 30. From the given line information a1, a2 and b1, it follows that at the same time the output 27 will deliver instantaneous information ½(a2+b1) and the output 30 instantaneous information ½(a1+b1).

The output 27 of the halving circuit 26 is connected to an input 31 of a switch-over device 32, which is provided with a further input 33, an output 34 and a switching input 35. The output 30 of the halving circuit 29 is connected to an input 36 of a switch-over device 37, which is provided with a further input 38, an output 39 and a switching input 40. The output 34 of the switch-over device 32 is connected to an input 41 of a delay device 42, which has a delay time equal to TV−½TH and is provided with an output 43. The output 43 is connected to an input 44 of a switch-over device 45, which is provided with a further input 46, an output 47 and a switching input 48. The output 39 of the switch-over device 37 is connected to the input 46. The output 47 is connected to an output terminal 49 of the television circuit. The output terminal 49 carries picture information PS' which is derived, in a manner that will be described in more detail, from the supplied picture information PS. The switching input 48 of the switch-over device 45 is connected to the output 3 of the source 1. The switch-over device 45 is drawn as a mechanical switch with two switching contacts T1 and T2 which are connected to the respective inputs 46 and 44. Contact T1 and T2 are connected to the output 47 during the field periods TV1 and TV2, respectively. In practice, the switch-over devices 32, 37 and 45 will have the form of electronic switches.

The input 33 of the switch-over device 32 is connected to the junction point 7' between the output 7 of delay device 6 and the input 8 of delay device 9, so that the input 33 carries the instantaneous line information b1. The input 38 of the switch-over device 37 is connected to the junction point 13' between the output 13 of delay device 12 and the input 14, of delay device 15, so that the input 38 carries the instantaneous information a1. The use of the halving circuits 29 and 26 ensures an equivalent signal supply, namely a1 relative to $\frac{1}{2}(a1+b1)$ and b1 relative to $\frac{1}{2}(a2+b1)$ to the switch-over devices 37 and 32. Instead of the use of the halving circuits 29 and 26, the inputs 38 and 33 can be preceded by amplitude doubling circuits.

The switching inputs 35 and 40 are interconnected and are coupled to an output 50 of a movement detector 51. The movement detector 51 comprises a subtraction circuit 52 of which, for example, a (−) input 53 is thereof connected to the junction point 7' of the series arrangement (6, 9, 12, 15) of three field delay devices 6, (9+12), and 15, each having a delay time substantially equal to the field period, a (+) input 54 thereof is connected to the junction point 16', and an output 55 of the subtraction circuit 52 carries the difference information z1−b1. An exchange of the (+) and (−) inputs results in a difference information b1−z1. The difference information is considered, in an instantaneous manner, to belong to one and the same image point on the first line of the television field Z or B, respectively. If, in the intermediate two field periods or in the frame period TP, no change in information, primarily caused by movement, occurs at the image point considered, the output signal is then substantially equal to zero and a no-movement detection situation exists. If a movement is detected, the information z1−b1 corresponds to a positive or a negative signal.

In addition to a movement detection taking place via the connection to the junction points 16' and 7' over the frame period TP between the television fields Z and B, the same takes place between the television fields A and C by a connection to the junction points 13' and 5'. To this end, a subtraction circuit 56 has a (−) input 57 connected to the junction point 5' and a (+) input 58 connected to the junction point 13', as a result of which an output 59 carries the difference information a1−c1. The output 55 is connected to an input 60 of a full-wave rectifying circuit 61 which is provided with an output 62. The output 59 is connected to an input 63 of a full-wave rectifying circuit 64 which is provided with an output 65. The output 62 and the output 65, with the absolute value of the difference informations, are connected to inputs 66 and 67, respectively, of an adding circuit 68. An output 69 of the adding circuit 68, in which there may be a low-pass filter present, is connected to an input 70 of a noise-threshold circuit 71 which has an output 72 connected to the output 50 of the detector 51. The movement detector 51 comprises the delay devices 6, 9, 12 and 15, the subtraction circuits 52 and 56, the full-wave rectifying circuits 61 and 64, the adding circuit 68 and the noise-threshold circuit 71.

The movement detector 51 operates with a movement detection over a total of four field periods or over two frame periods, with duplicated detection, which leads to very accurate detection. The simplest possibility for each detector is the use of the delay devices 9, 12 and 15 and the circuits 52, 61 and 71. Further, it is possible to combine the circuits 52 and 56 and to follow them with the circuits 61 and 71.

The operation of the television circuit as in FIG. 1 is explained on the basis of the drawn positions of the switch-over devices 45, 37 and 32, it being assumed that the indicated line information is present. If during the first field period TV1, a movement in the scene is detected by the detector 51, the input 36 of the switch-over device 37 is then connected to the output 39 and the combined line information $\frac{1}{2}(a1+b1)$ appears in the picture information PS'. If no movement is detected in the scene, the input 38 is connected and the original line information a1 appears in the picture information PS'. At the same time, in the event of movement detection, respectively, or no movement detection the combined line information $\frac{1}{2}(a2+b1)$ or the original line information b1, respectively, is applied to the delay device 42 via the switch-over device 32. During the second field period TV2, the delay device 42 delivers the combined or the original line information to the then connected input 44, as a result of which this information appears in the picture information PS'. During this second field period TV2, the movement detector 51 is operative but the switching action in the switch-over devices 37 and 32 has no influence on the picture information PS'.

When movement in the scene is detected, the original information of the television fields A and B is converted into the combined information. Information for a line (for example line information b1) is thereby combined in the first field period TV1 with the information for the superjacent line (here line information a1), while in the second field period, the information from the subjacent line (here line information a2) is used for this. For obtaining the chosen combination of information at the right moment at the output 43 of the delay device 42, the latter has a delay time equal to a field period minus a half-line period. There is of course between the occurrence of the information of line a2 and of line b1 a time difference equal to $TV-\frac{1}{2}TH$, as indicated for the delay device 9.

The picture information PS' is now suitable for the described storage in a disc pick-up and reproduction device with the possibility of stop-motion or still picture display. Further, the picture information PS' is suitable, after field and line frequency doubling, for reproduction with a picture display device in accordance with the described ABAB method with the advantages thereby described. In both cases, there is the advantage of the flicker correction for moving parts of the picture.

Basic components of the television circuit in accordance with FIG. 1 are a first, second and third switch-over device 45, 32 and 37, respectively, a first and a second adding circuit 19 and 22, respectively, and a first, second and third delay device 9, (9+12), and 42, respectively, of which the first two are coupled with the input terminal 4. To obtain, at the right time, movement detection or no-movement detection on the basis of a comparison over a frame period TP, use is made of the delay device 15, which may be omitted if it is sufficient to have a less exact movement or no-movement detection on the basis of a comparison over a field period TV. The use of the two delay devices 6 and 15 makes it possible to have accurate movement/no-movement detection on the basis of a comparison over two frame periods TP.

Figure 2:
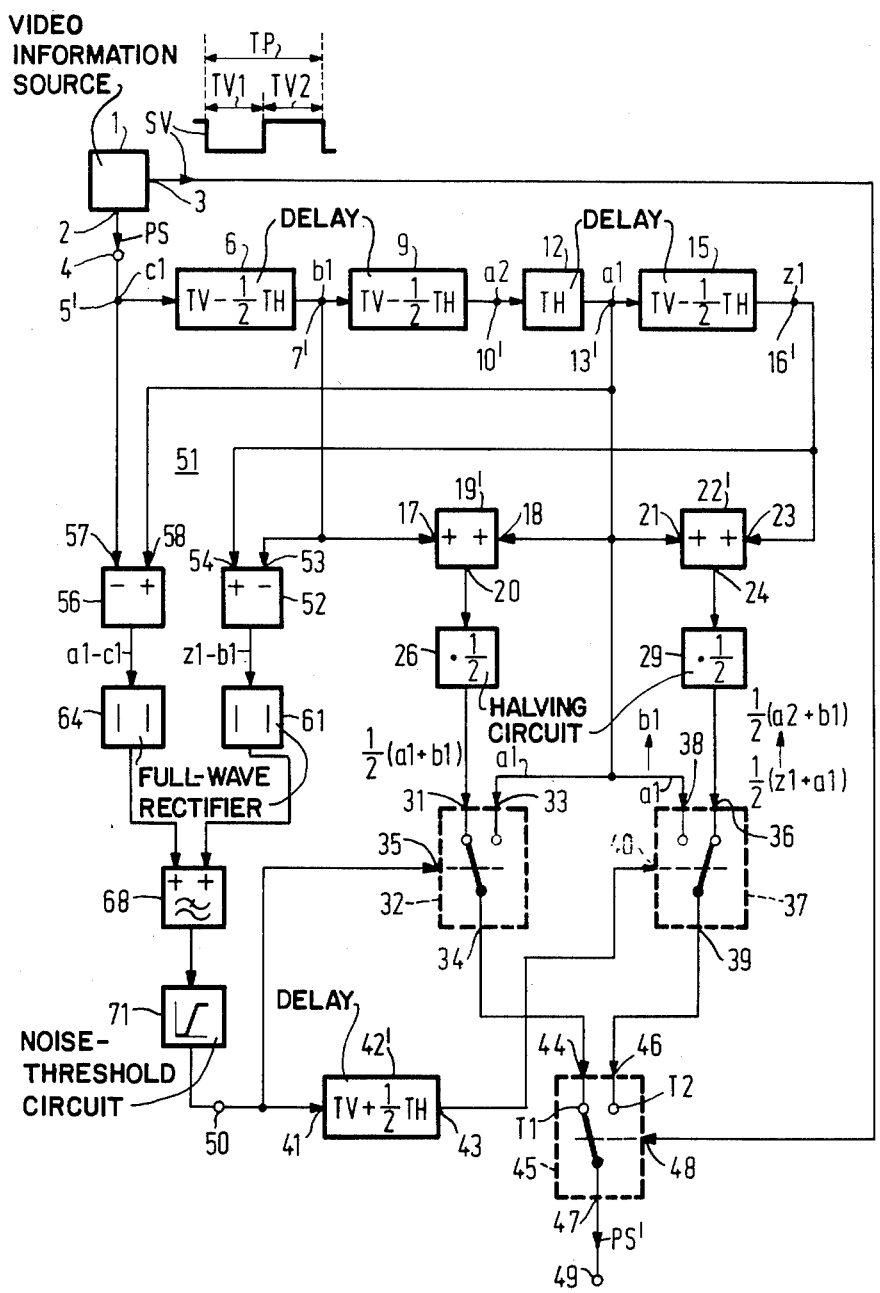
FIG. 2 shows a second embodiment.

FIG. 2 shows a second embodiment of a television circuit in accordance with the invention in which corresponding circuit elements have the same references as indicated in FIG. 1. To emphasize some important differences relating to the connections to the inputs and outputs, some circuit components are marked with a prime, such as the adding circuits 19' and 22' and the delay device 42'.

The input terminal 4 is connected with the series arrangement (6, 9, 12, 15) of delay devices, and it is assumed that the information on lines z1, a1, a2, b1 and c1 will appear on the respective junction points 16', 13', 10', 7' and 5'. Between the inputs 17 and 18 of the first adding circuit 19', a first delay device (9+12) is now present, and between the inputs 21 and 23 of the second adding circuit 22', a second delay device 15 is present. The input 31 of the second switch-over device 32 is connected to the output 20 of the adding circuit 19', which now, however, is supplied with the instantaneous information $\frac{1}{2}(a1+b1)$. The input 36 of the third switch-over device 37 receives from the output 24 of the adding circuit 22', at the same time, instantaneous information $\frac{1}{2}(z1+a1)$. Here the inputs 33 and 38 are both connected to the junction point 13' with the instantaneous line information a1 thereon. The output 34 of the second switch-over device 32 is connected to the input 44 of the first switch-over device 45, with which, however, the contact T1 is coupled. The positions indicated in FIG. 2 of the switch-over devices 45, 32 and 37 are in accordance with the information transfer $\frac{1}{2}(a1+b1)$ as described with FIG. 1. The switching of the switch-over devices 32 and 37 is done according to FIG. 2 not simultaneously as in FIG. 1 but takes place a field period plus a half-line period later, because the delay device 42', having this delay time $TV+\frac{1}{2}TH$, is located between the output 50 of the movement detector 51 and the switching input 40 of the switch-over device 37. The result is that during the connection in the second field period TV2 of the contact T2 with the input 46, the information of b1 and $\frac{1}{2}(a2+b1)$ is present at the inputs 38 and 36 of the switch-over device 37. As indicated with the delay devices 12 and 9, the information b1 occurs with a delay time $TV-\frac{1}{2}TH+TH=TV+\frac{1}{2}TH$ relative to the information a1. With the same delay time, the information a2 follows the information z1 and the information b1 follows the information a1. With the changed connections of the delay device 42' and the adding circuits 19' and 22' and where the switch-over devices 32 and 37 have exchanged switching frequency, the same information a1 or $\frac{1}{2}(a1$ and $b1)$ nevertheless appears in the first field period TV1 and b1 or $\frac{1}{2}(a2+b1)$ in the second field period TV2 in the information PS'.

In both embodiments of the television circuit in accordance with FIG. 1 and FIG. 2, the delay devices 42 and 42', respectively, provide for information transfer during the second field periods TV2 of the frame periods TP.

What is claimed is:

1. A television circuit for picture flicker correction, provided with a first and a second delay device coupled to an input terminal of the television circuit, said delay devices each having a delay time substantially corresponding to a field period, inputs of a first and a second adding circuit being respectively connected in parallel with the first and the second delay devices, outputs of the first and second adding circuits being coupled to respective inputs of a first switch-over device which has a switching input for receiving a switching signal controlling the switching of the first switch-over device at the occurrence of each field period, an output of the first switch-over device being coupled the an output terminal of the television circuit, characterized in that the television circuit additionally comprises a movement detector, second and third switch-over devices having first inputs and outputs coupled, respectively, between the outputs of the first and second adding circuits and the respective inputs of the first switch-over device, switching inputs of the second and the third switch-over devices being respectively coupled to an output of the movement detector, the second and third switch-over devices each having a second input connected to a respective point of the first and second delay devices, which second inputs, in the absence of movement detection, are connected to the respective outputs of the second and third switch-over devices, to which respective outputs, in the presence of movement detection, the first inputs are connected, and a third delay device, having a delay time substantially equal to a field period, being coupled between the output of the second switch-over device and the respective input of the first switch-over device.

2. A television circuit as claimed in claim 1, characterized in that said first delay device has a delay time equal to a field period less a half-line period and said second delay device is constituted by a series arrangement of said first delay device and an additional delay device having a delay time equal to a line period, said second inputs of the second and third switch-over devices being respectively coupled to an input and an output of said series arrangement.

3. A television circuit as claimed in claim 2, characterized in that the third delay device has a delay time equal to a field period less a half-line period.

4. A television circuit for picture flicker correction, provided with a first and a second delay device coupled to an input terminal of the television circuit, said delay devices each having a delay time substantially corresponding to a field period, inputs of a first and a second adding circuit being respectively connected in parallel with the first and the second delay devices, outputs of the first and second adding circuits being coupled to respective inputs of a first switch-over device which has a switching input for receiving a switching signal controlling the switching of the switch-over device at the occurrence of each field period, an output of the first switch-over device being coupled to an output terminal of the television circuit, characterized in that the television circuit additionally comprises a movement detector, second and third switch-over devices having first inputs and outputs coupled, respectively, between the outputs of the first and second adding circuits and the respective inputs of the first switch-over device, switching inputs of the second and the third switch-over devices being respectively coupled to an output of the movement detector, the second and third switch-over devices each having a second input connected to a respective point of the first and second delay devices, which second inputs, in the absence of movement detection, are connected to the respective outputs of the second and third switch-over devices, to which respective outputs, in the presence of movement, the first inputs are connected, and a third delay device, having a delay time substantially equal to a field period, being coupled between the output of the movement detector and the switching input of the third switch-over device.

5. A television circuit as claimed in claim 4, characterized in that the first and second delay devices are respectively constituted by the series arrangement of a delay device having a delay time equal to a field period plus a half-line period and a delay device having a delay time equal to a field period less a half-line period, the said second inputs of the second and third switch-over devices being coupled with the junction point between the first and second delay devices.

6. A television circuit as claimed in claim 5, characterized in that the third delay device has a delay time equal to a field period plus a half-line period.

7. A television circuit as claimed in claim 1, 2, 3, 5, 6, or 4, characterized in that the movement detector includes three delay devices, partly formed by said first and second delay devices, each having a time delay which differs from one field period by half a line period, two outer of the three delay devices both having a delay period which is shorter than a field period while a middle one of the three delay devices has a delay which differs from that of the other two, said movement detector further comprising two subtraction circuits, having inputs coupled with junction points of said three delay devices between which there is a delay time equal to two field periods, and, between the two subtraction circuits and the output of the movement detector, full-wave rectifying means followed by a noise-threshold circuit.

8. A television circuit as claimed in claim 7, characterized in that said full-wave rectifying means comprises, coupled to outputs of the two subtraction circuits, respective full-wave rectifying circuits coupled via an adding circuit to the noise-threshold circuit.

* * * * *